(12) United States Patent
Hwang et al.

(10) Patent No.: US 12,497,112 B2
(45) Date of Patent: Dec. 16, 2025

(54) CONTAINER-SWAPPABLE VEHICLE AND CONTROL METHOD THEREOF

(71) Applicants: Hyundai Motor Company, Seoul (KR); Kia Corporation, Seoul (KR)

(72) Inventors: Jin Ho Hwang, Cheonan-Si (KR); Dong Eun Cha, Hwaseong-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 557 days.

(21) Appl. No.: 17/981,315

(22) Filed: Nov. 4, 2022

(65) Prior Publication Data

US 2023/0415828 A1   Dec. 28, 2023

(30) Foreign Application Priority Data

Jun. 28, 2022 (KR) .................. 10-2022-0079121

(51) Int. Cl.
*B62D 53/12* (2006.01)
*B62D 53/00* (2006.01)
(Continued)

(52) U.S. Cl.
CPC ........... *B62D 53/12* (2013.01); *B62D 53/005* (2013.01); *B62D 53/0842* (2013.01); *H02K 49/104* (2013.01); *H02P 15/00* (2013.01)

(58) Field of Classification Search
CPC .. B62D 53/12; B62D 53/005; B62D 53/0842; B62D 53/04; B62D 33/077; H02K 49/104; H02P 15/00; G05D 1/0297; G05D 1/0225; B60D 2001/005; B60D 1/015; B60P 3/40; B60P 1/6409; B60P 1/6436; B60P 1/6418; B60P 7/13; H01F 7/0242; B60Y 2200/145; B60Y 2400/301
See application file for complete search history.

(56) References Cited

U.S. PATENT DOCUMENTS

2004/0250724 A1   12/2004   Sobolewski
2009/0108556 A1   4/2009   Hungerink et al.
(Continued)

FOREIGN PATENT DOCUMENTS

CN     114013363 A  *  2/2022
DE     102016013645     6/2017
(Continued)

*Primary Examiner* — Drew J Brown
(74) *Attorney, Agent, or Firm* — Morgan Lewis & Bockius LLP

(57) ABSTRACT

A container-swappable vehicle includes a container including a container body for receiving a cargo loaded therein, a rotation shaft at a front end portion or a rear end portion thereof, and a coupling body surrounding an external circumferential surface of the rotation shaft, the rotation shaft and the coupling body being connected to each other to be relatively rotated therebetween; and a drive module including a drive device to perform driving, a coupling space including an open side, and a magnetic module provided in the coupling space to allow the coupling body of the container to enter the coupling space through an opening portion by driving toward the coupling body of the container and move the container through driving by the magnetic module being fastened to the coupling body by magnetic force.

18 Claims, 9 Drawing Sheets

(51) Int. Cl.
*B62D 53/08* (2006.01)
*H02K 49/10* (2006.01)
*H02P 15/00* (2006.01)

(56) References Cited

U.S. PATENT DOCUMENTS

| | | | |
|---|---|---|---|
| 2011/0025020 A1 | 2/2011 | Alguera et al. | |
| 2017/0369101 A1* | 12/2017 | Sommer | G05D 1/024 |
| 2019/0187716 A1 | 6/2019 | Cantrell et al. | |
| 2020/0011705 A1* | 1/2020 | Zwijze | G01D 5/145 |
| 2021/0114521 A1* | 4/2021 | Niewiadomski | G05D 1/0231 |
| 2021/0240200 A1 | 8/2021 | Claesson et al. | |
| 2021/0278856 A1* | 9/2021 | Kniess | G01S 17/931 |

FOREIGN PATENT DOCUMENTS

| | | | |
|---|---|---|---|
| DE | 10 2018 203 120 | 9/2019 | |
| DE | 102020127261 A1 * | 4/2021 | B60D 1/015 |
| EP | 3536584 A1 | 9/2019 | |
| EP | 3912860 A1 | 11/2021 | |
| IT | 2018-00003333 | 9/2019 | |
| KR | 10-0718660 | 5/2007 | |
| KR | 10-2021-0052561 | 5/2021 | |

* cited by examiner

CONTAINER-SWAPPABLE VEHICLE AND CONTROL METHOD THEREOF

CROSS-REFERENCE TO RELATED APPLICATION(S)

The present application claims priority to Korean Patent Application No. 10-2022-0079121, filed on Jun. 28, 2022, the entire contents of which is incorporated herein for all purposes by this reference.

BACKGROUND OF THE PRESENT DISCLOSURE

Field of the Present Disclosure

The present disclosure relates to a vehicle allowing container swapping, and provides a technology relating to a vehicle which includes a drive module couplable to a container and in which a drive module may be freely coupled to or decoupled from a container through a magnetic module.

Description of Related Art

Containers, specifically, road-transportable shipping containers, are important products generally used on ships or loaded vehicles. In some instances, such shipping containers may be fixed in a form of a trailer having wheels disposed under the container and configured to be towed behind a tow vehicle, such as a tractor trailer. Such trailers often need to move backward to a shipping dock configured to compensate for the raised height of the container caused by the wheels, to permit convenient loading and unloading of the cargo. However, in case that the cargo is required be loaded onto or unloaded from the ground, such a configuration may cause inconvenience and/or result in additional labor, difficulty in handling of the cargo, and the demand for additional equipment such as, for example, a forklift, to handle the cargo. Such trailer-type containers may also be difficult or inconvenient in storing and/or shipping a cargo due to the additional structure and the necessity for handling of the trailer components attached to the container.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle which includes a drive module including a drive device and a container including a loading space for receiving a cargo loaded therein, wherein the drive module and the container may be coupled or decoupled by a magnetic module, so that the container is easily swappable by the drive module.

A container-swappable vehicle according to an exemplary embodiment of the present disclosure includes: a container including a container body for receiving a cargo loaded therein, a rotation shaft at a front end portion or a rear end portion thereof, and a coupling body surrounding an external circumferential surface of the rotation shaft, the rotation shaft and the coupling body being connected to each other to be relatively rotated therebetween; and a drive module including a drive device to perform driving, a coupling space including an open side, and a magnetic module provided in the coupling space to allow the coupling body of the container to enter the coupling space through an opening portion and move the container by the magnetic module being fastened to the coupling body by magnetic force.

The container may include a bearing provided between the coupling body surrounding the rotation shaft and the rotation shaft so that the coupling body may relatively rotate with the coupling body.

The container may include an extension portion extending from an upper portion of a front side or a rear side of the container body, and the rotation shaft and the coupling body extend downwardly from a lower surface of the extension portion, and the drive module may drive toward a lower portion of the extension portion to allow the coupling body to be inserted into the coupling space.

The container may include a first location detection sensor provided on the extension portion or the container body, and the drive module may include a second location detection sensor provided at a location corresponding to the first location detection sensor and detecting a relative location with the first location detection sensor.

The first location detection sensor may be provided on the lower surface of the extension portion and the front surface or the rear surface of the container body and a plurality of second location detection sensors may be provided to correspond to the location of the first location detection sensor to align locations of the container and the drive module.

The magnetic module may include a module body coupled to the coupling body, a rotational magnetic body rotatably coupled to the module body, a fixed magnetic body fixed to the module body, and a coil wound around and electrically connected to the module body, to be couplable to or decouplable from the coupling body by changing a magnetic circuit through a direction of a magnetic field formed by the coil.

A plurality of magnetic modules may be provided in the coupling space to be coupled to the coupling body in a plurality of directions.

The drive module may include a moving portion rotatably coupled to opposite end portions of an open side of the coupling space and including the magnetic module disposed therein, and a first actuator configured to rotate the moving portion, and when the coupling body is inserted into the coupling space, the moving portion may be rotated toward the coupling body by the first actuator, and the magnetic module may be fastened to the coupling body.

The drive module may include a contact portion coming in contact with the rotation shaft and a second actuator configured to move the contact portion to be in contact with or separated from the rotation shaft.

The container may include a first connection module penetrating through the inside of the rotation shaft in an upward/downward direction and formed on an internal circumferential surface thereof, and the drive module may include a second connection module inserted into the first connection module to connect the drive module and the container, and a third actuator configured to move the second connection module in an upward/downward direction to be coupled to or decoupled from the first connection module.

The container may include a battery portion configured to store power, and each of the first connection module and the second connection module may include a signal connection portion electrically connected to input/output a control signal therethrough, and a power connection portion configured to input/output power therethrough.

The rotation shaft and a fastening portion may be provided on the front side and the rear side of the container, and a plurality of drive modules may be provided to be connected to the front side and the rear side of the container to perform driving.

An indented portion may be formed on the coupling body to be indented from an external circumferential surface to the center, and the magnetic module may be inserted and fastened to the coupling body.

The indented portion may include a corrugation portion protruding in a circumferential direction on an internal side surface thereof, and a surface of the magnetic module, which is in contact with the corrugation portion, may be formed to correspond to the corrugation portion.

The drive module may drive toward the container body so that the coupling body is inserted into the open coupling space and the magnetic module may be fixed after the coupling body is inserted into the coupling space, and move the container body through driving.

A method of controlling a container-swappable vehicle according to an exemplary embodiment of the present disclosure may include: an operation of identifying locations of each of a drive module and a container; based on the locations of the drive module and the container identified in the operation of identifying locations, an operation of moving the drive module toward the container so that a coupling body is inserted into a coupling space; and an operation of coupling the drive module and the container by operating a magnetic module.

The control method may further include an operation of connecting the drive module and the container in terms of power and a control signal after the coupling.

The control method may further include an operation of identifying a drive direction of the drive module after the coupling; and an operation of controlling a contact portion coming in contact with a rotation shaft according to straight driving or turning driving of the drive module identified in the operation of identifying the drive direction, and a second actuator configured to move the contact portion to be in contact with or separated from the rotation shaft.

The container-swappable vehicle according to an exemplary embodiment of the present disclosure includes a drive module including a drive device and a container including a loading space for receiving a cargo therein, wherein the drive module and the container may be coupled or decoupled by a magnetic module. Therefore, the drive module can freely perform container swapping.

Furthermore, the container includes a rotation shaft extending upward and downward, a coupling body surrounding the rotation shaft and relatively movable, and a magnetic module provided in the drive module and coupled to the coupling body to reduce a ration radius of the drive module when the drive module rotates, and a contact portion capable of coming into contact with or separating from the rotation shaft, so that the contact portion comes in contact with the rotation shaft to improve driving stability of a vehicle during straight driving, and is separable from the rotation shaft to enable turning of the vehicle.

Furthermore, the container and the drive module are electrically connected to each other, so that a control signal or power may be input to the drive module to assist driving of the drive module.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
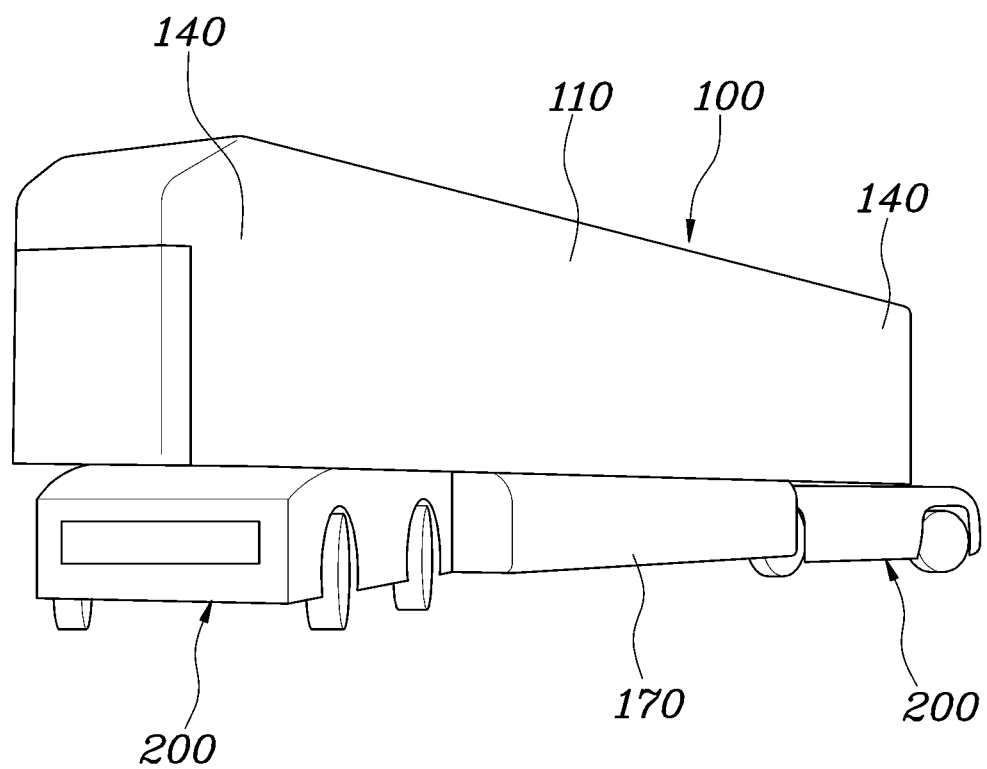
FIG. 1 is a perspective view exemplarily illustrating a container-swappable vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

A specific structural or functional description of embodiments of the present disclosure set forth in the specification or application is provided merely for describing the exemplary embodiment of the present disclosure. Therefore, the exemplary embodiments of the present disclosure may be implemented in various forms, and the present disclosure should not be construed as being limited to the exemplary embodiments described in the specification or application.

Various changes and modifications may be made to the exemplary embodiments according to an exemplary embodiment of the present disclosure, and therefore various exemplary embodiments will be illustrated in the drawings and described in the specification or application. However, it should be understood that embodiments according to the concept of the present disclosure are not limited to the disclosed exemplary embodiments of the present disclosure, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e., "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, various exemplary embodiments of the present disclosure will be described in detail with reference to the accompanying drawings. Similar or like reference signs presented in the respective drawings designate similar or like elements.

Figure 2:
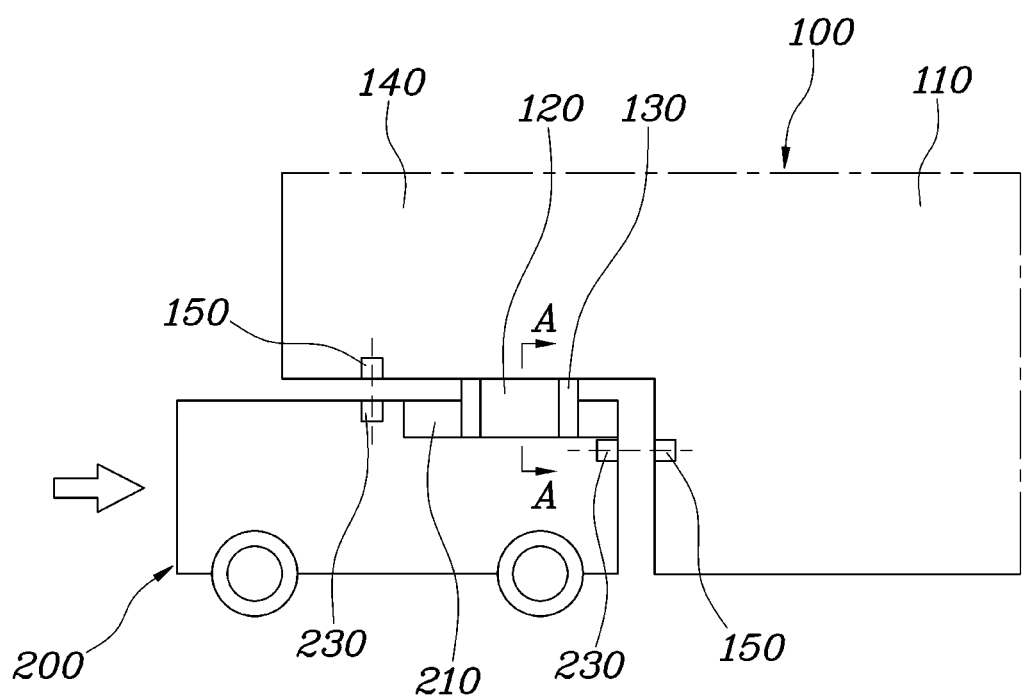
FIG. 2 is a lateral sectional view exemplarily illustrating a container-swappable vehicle according to an exemplary embodiment of the present disclosure.
Figure 3:
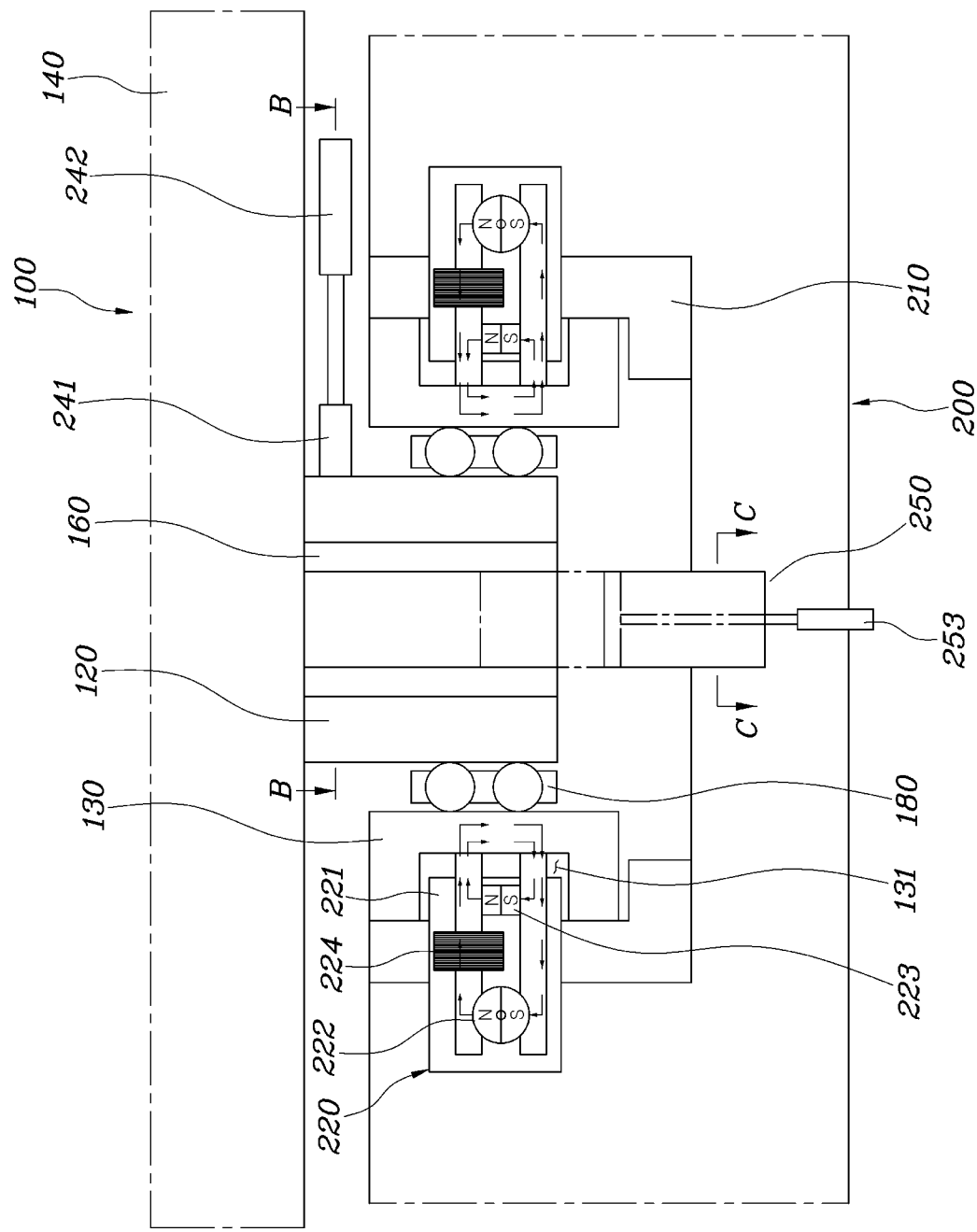
FIG. 3 is a sectional view of FIG. 2 taken along A-A.
Figure 4:
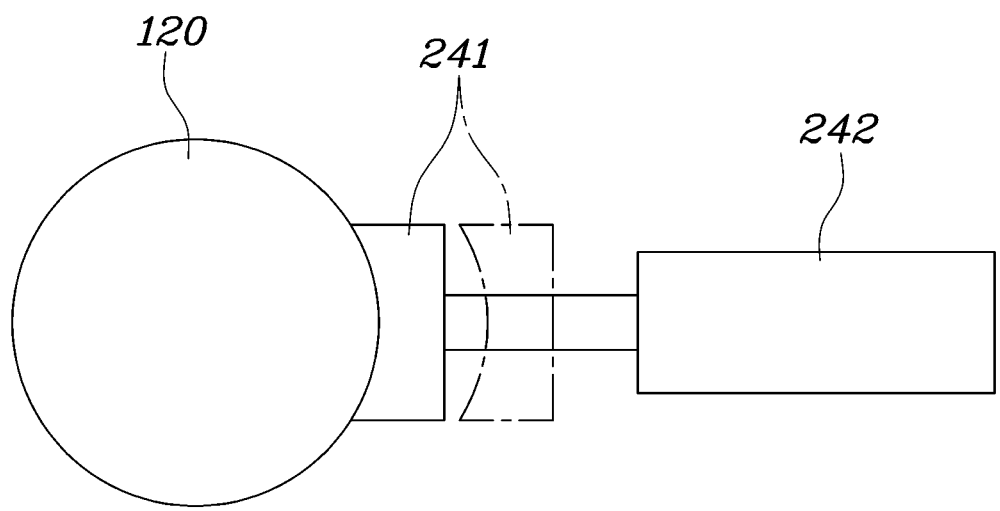
FIG. 4 is a sectional view of FIG. 3 taken along B-B.
Figure 5:
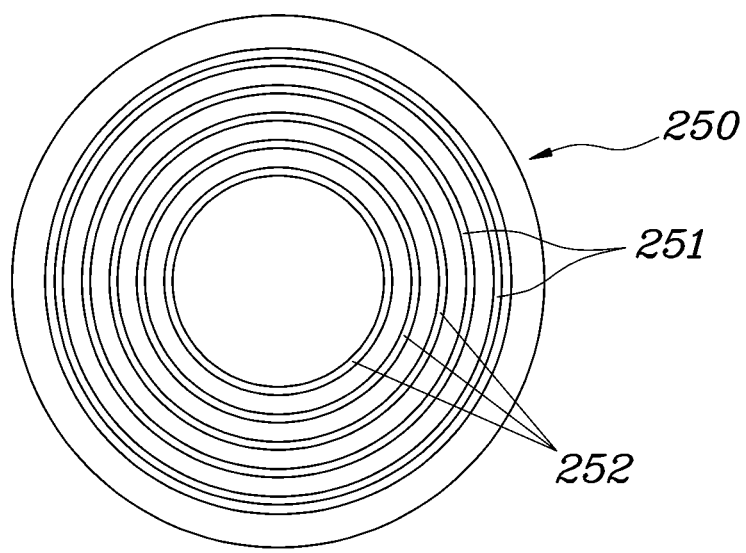
FIG. 5 is a sectional view of FIG. 3 taken along C-C.
Figure 6:
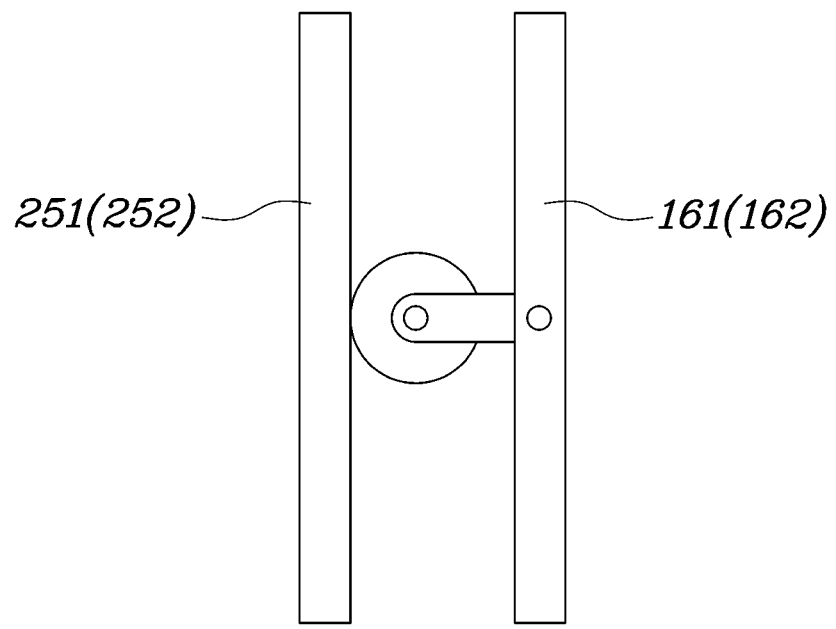
FIG. 6 is a view exemplarily illustrating connection of a first connection module and a second connection module of a container-swappable vehicle according to an exemplary embodiment of the present disclosure.
Figure 7:
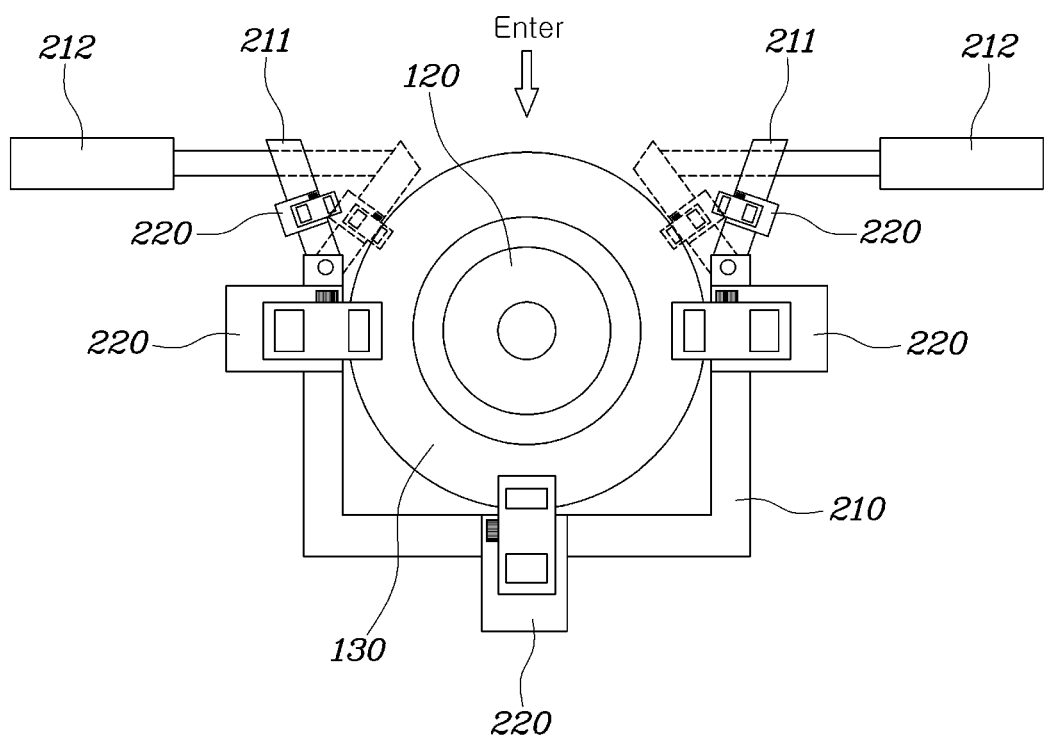
FIG. 7 is a planar view exemplarily illustrating a coupling space and a coupling body of a container-swappable vehicle according to an exemplary embodiment of the present disclosure.
Figure 8:
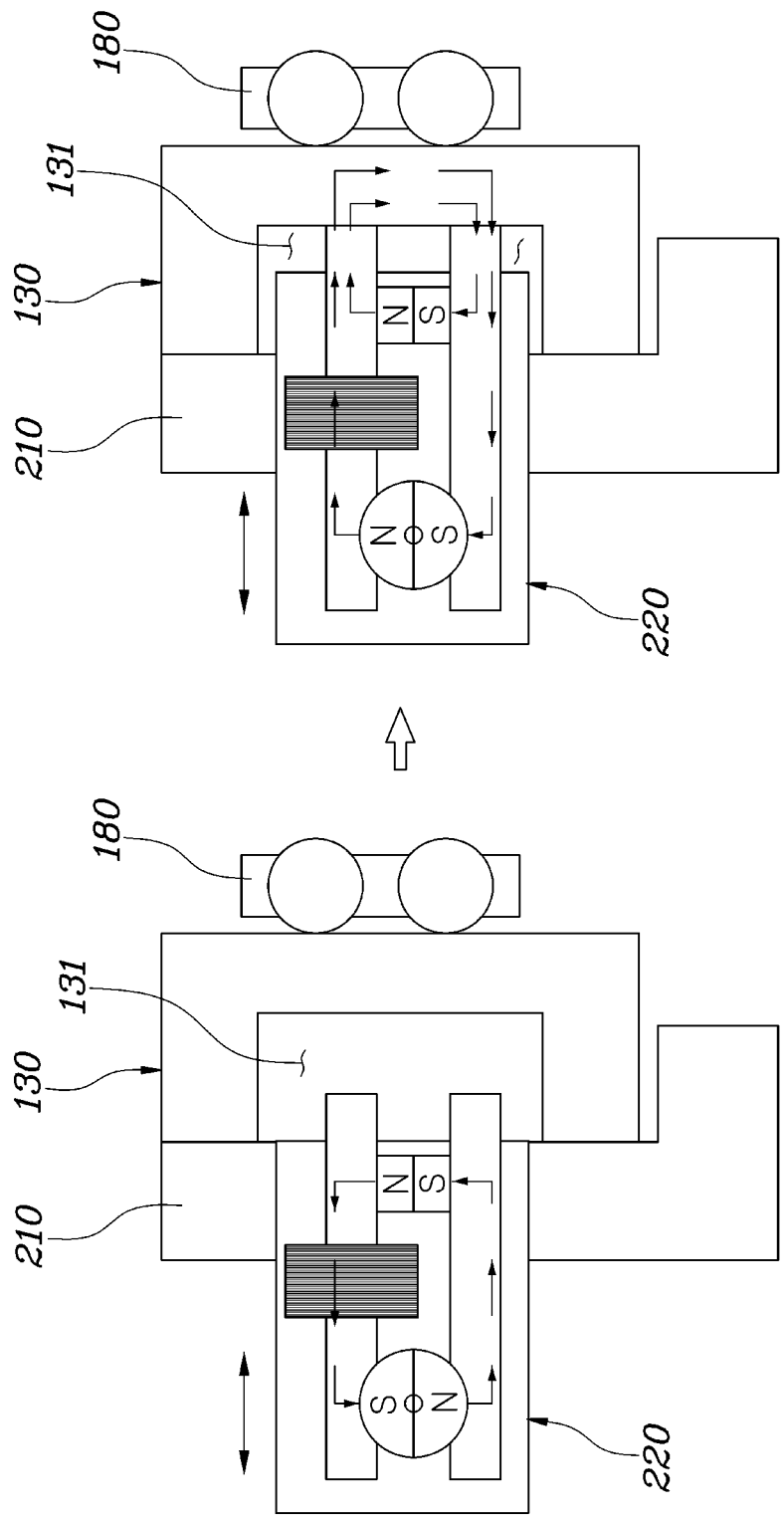
FIG. 8 is a view exemplarily illustrating movement of a magnetic module of a container-swappable vehicle according to an exemplary embodiment of the present disclosure.
Figure 9:
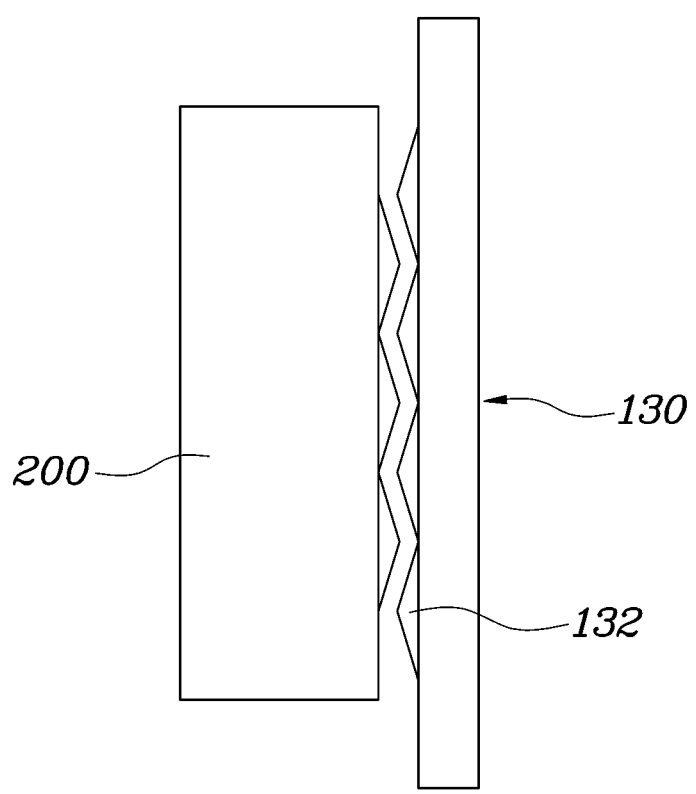
FIG. 9 is a view exemplarily illustrating coupling regions of a magnetic module coupling body of a container-swappable vehicle according to an exemplary embodiment of the present disclosure.

FIG. 1 is a perspective view exemplarily illustrating a container swappable vehicle according to an exemplary embodiment of the present disclosure, FIG. 2 is a lateral sectional view exemplarily illustrating a container swappable vehicle according to an exemplary embodiment of the present disclosure, FIG. 3 is a sectional view of FIG. 2 taken along A-A, FIG. 4 is a sectional view of FIG. 3 taken along B-B, FIG. 5 is a sectional view of FIG. 3 taken along C-C, FIG. 6 is a view exemplarily illustrating connection of a first connection module 160 and a second connection module 250 of a container swappable vehicle according to an exemplary embodiment of the present disclosure, FIG. 7 is a planar view exemplarily illustrating a coupling space 210 and a coupling body 130 of a container swappable vehicle according to an exemplary embodiment of the present disclosure, FIG. 8 is a view exemplarily illustrating movement of a magnetic module 220 of a container swappable vehicle according to an exemplary embodiment of the present disclosure, and FIG. 9 is a view exemplarily illustrating coupling regions of a magnetic module 220 and coupling body 130 of a container swappable vehicle according to an exemplary embodiment of the present disclosure.

An embodiment of the container swappable vehicle according to an exemplary embodiment of the present disclosure will be described with reference to FIG. 1 to FIG. 9.

The container swappable vehicle according to an exemplary embodiment of the present disclosure includes, specifically, a container 100 including a container body 110 configured to receive a cargo loaded therein, a rotation shaft 120 at a front end portion or a rear end portion thereof, and a coupling body 130 surrounding an external circumferential surface of the rotation shaft 120, the rotation shaft 120 and the coupling body 130 being connected to each other to be relatively rotated; and a drive module 200 including a drive device to perform driving, a coupling space 210 including an open side, and a magnetic module 220 provided in the coupling space 210 to allow the coupling body 130 of the container 100 to enter the coupling space 210 through an opening portion by driving toward the coupling body 130 of the container 100 and move the container 100 through driving by the magnetic module 220 being fastened to the coupling body 130 by magnetic force.

The container 100 may include, as described with reference to FIG. 1, the container 100 body including loading space for receiving a cargo loaded therein, and as described with reference to FIG. 2, FIG. 3 and FIG. 4, may include the rotation shaft 120 positioned at the front side or the rear side of the container body 110 and extending in an upward/downward direction, and the coupling body 130 configured to surround the rotation shaft 120.

The drive module 200 may include a drive device for driving a vehicle including a wheel, a steering system, and a power module to perform driving by itself, the coupling space 210 including an open lateral side, and may drive toward the container 100 to allow the coupling body 130 to be inserted into the open coupling space 210 so that the coupling body 130 may be inserted into an open space.

After the coupling body 130 is inserted into the open space, the magnetic module 220 provided in the open space is operated so that the coupling body 130 and the magnetic module 220 may be coupled to each other by magnetic force.

After the coupling body 130 and the magnetic module 220 are coupled to each other, the drive module is driven to move the fastened container 100 to a predetermined location. Furthermore, after the container 100 is moved to the predetermined location, the drive module and the container 100 may be released from the fastening, and the drive module may be fastened to another container 100 to move the another container 100.

The drive module may be manufactured to be configured for autonomous driving or to be directly driven by a driver boarding therein.

Furthermore, the drive module may additionally include a mount device for mounting the container 100 when the drive module and the container 100 are separated from each other.

Accordingly, the drive module 200 and the container 100 may be easily coupled to or decoupled from each other by the magnetic module 220 so that drive module 200 can swap and move a plurality of drive modules 200.

The container 100 may include a bearing 180 provided between the rotation shaft 120 and the coupling body 130 surrounding the rotation shaft 120 to allow the coupling body 130 to relatively rotate with the rotation shaft 120.

As shown in FIG. 3, the rotation shaft 120 may be provided on the front side or the rear side of the container 100, formed in a shape of a pillar extending in an upward/downward direction, and the coupling body 130 may be coupled to the rotation shaft 120 to surround the rotation shaft 120. The rotation shaft 120 may be formed to be fixed to the container 100 and the coupling body 130 may be coupled to the rotation shaft 120 to be rotatable by the bearing 180 with reference to the center extension line of the rotation shaft 120.

Accordingly, the drive module 200 having been coupled to the coupling body 130 by the magnetic module 220 may be reduced in rotation radius while driving by rotation of the coupling body 130.

The container 100 may include an extension portion 140 extending from an upper portion of the front side and the rear side of the container 110, the rotation shaft 120 and the coupling body 130 may extend downwardly from the lower surface of the extension portion 140, and the drive module 200 may drive toward the lower portion of the extension portion 140 to allow the coupling body 130 to be inserted into the coupling space 210.

As shown in FIG. 1 and FIG. 2, the container 100 may include the extension portion 140 extending from the upper portion of the front side and the rear side of the container body in a longitudinal direction, the rotation shaft 120 may extend downwardly from the lower surface of the extension portion 140, and the coupling body 130 may be formed to surround an external circumferential surface of an end side of the extension portion 140.

For the coupling body 130 formed as described above to be inserted into the coupling space 210, the drive module 200 may drive toward the lower side of the extension portion 140 to be coupled to the container 100.

Accordingly, the rotation radius occupied by the drive module 200 during turning driving may be reduced, and the loading space may be expanded by loading a cargo up to the extension portion 140.

The container 100 may include a first location detection sensor 150 provided on the extension portion 140 or the container body 110, and the drive module 200 may include a second location detection sensor 230 provided at a location corresponding to the first location detection sensor 150 and configured to detect a relative location with the first location detection sensor 150.

As shown in FIG. 1, the first location detection sensor 150 configured for detecting a location may be provided in the container 100, and the second location detection sensor 230 may be provided in the drive module 200 at a location corresponding to the first location detection sensor 150 in a state in which the drive module is coupled to the container 100.

Accordingly, the drive module 200 and the container body 110 may accurately identify a coupling location and drive to be coupled to each other.

The first location detection sensor 150 may be provided on the lower surface of the extension portion 140 and the front surface or the rear surface of the container body 110, and a plurality of second location detection sensors 230 may be provided to correspond to the location of the first location detection sensor 150 to align locations of the container 100 and the drive module.

As shown in FIG. 2, a plurality of first location detection sensors 150 are located at positions such as the front side of the container body 110 and the lower surface of the extension portion 140, and the second location detection sensors are located on the upper side and the rear side of the drive module 200, which are locations corresponding to the first location detection sensors 150, improving accuracy of coupling of the drive module 200 and the container body 110 by aligning the drive module 200 and the container body 110 in a leftward/rightward direction and a forward/backward direction when the drive module and the container body are coupled to each other.

The first location detection sensor 150 may be provided on the lower surface of the extension portion 140 and the front surface or the rear surface of the container body 110, and a plurality of second location detection sensors 230 may be provided to correspond to the location of the first location detection sensor 150 to align locations of the container 100 and the drive module.

When the drive module 200 identifies that drive module 200 drives to the container 100 through the first location detection sensor 150 and the second location detection sensor 230, the magnetic module 220 may be fastened to the coupling body 130.

The magnetic module 220 may include a module body 221 coupled to the coupling body 130, a rotational magnetic body 222 rotatably coupled to the module body 221, a fixed magnetic body 223 fixed to the module body 221, and a coil 224 wound around and electrically connected to the module body 221, and may be coupled to or decoupled from the coupling body 130 by a magnetic circuit change through a direction of a magnetic field generated by the coil 224.

As shown in FIG. 3, the magnetic module 220 may include the module body 221, the rotational magnetic body 222 may be provided on one side of the module body 221 to be rotatably coupled to the module body 221, and the fixed magnetic body 223 is provided on the other side of the module body 221 to be fixed to the module body 221. The coil 224 may be provided between the rotational magnetic body and the fixed magnetic body 223 while being wound around and coupled to the module body 221, the coil 224 may be connected to a power source to allow a current to flow therethrough, and when a current flows through the coil 224, an electromagnet may be formed by forming a magnetic field by the wound coil 224.

A polarity of the electromagnet generated by the coil 224 may be changed through the direction of the current flowing through the coil 224, thus the rotational magnetic body 222 may rotate, the magnetic circuit formed by the rotational magnetic body 222 and the fixed magnetic body 223 may be changed, and the magnetic module 220 and the coupling body 130 may be fastened to each other by magnetic force according to the changed magnetic circuit.

The current flowing through the coil 224 may flow only at the moment at which the rotational magnetic body 222 is rotated and may be blocked after the rotational magnetic body 222 is rotated, thus achieving excellent electrical efficiency compared to an electromagnet.

As shown in FIG. 8, the change of a magnetic circuit according to the magnetic field generated by the coil 224 may be identified and the magnetic module 220 and the coupling body 130 may be coupled to each other by magnetic force according to the direction of the magnetic circuit.

When coupled to the coupling body 130, the magnetic module 220 may extend to the internal side of the coupling space 210 and fastened to the coupling body 130 by the magnetic force and the magnetic circuit may be changed through the direction of the current of the coil 224.

A plurality of magnetic modules 220 may be provided in the coupling space 210 to be fastened to the coupling body 130 in a plurality of directions.

As shown in FIG. 7, the plurality of magnetic modules 220 may be provided in the coupling space 210 to be space apart from each other and fastened to the fastening portion in various directions.

Accordingly, fastening force between the drive module 200 and the container 100 may be improved as the plurality of magnetic modules 220 are fastened to the coupling body 130 in various directions.

The drive module may include a moving portion 211 rotatably coupled to opposite end portions of an open side of the coupling space 210 and including the magnetic module 220 disposed therein, and a first actuator 212 configured to rotate the moving portion 211, and when the coupling body 130 is inserted into the coupling space 210, the moving portion 211 may be rotated to the coupling body 130 side by the first actuator 212 and the magnetic module 220 may be fastened to the coupling body 130.

As shown in FIG. 3, a pair of moving portions 211 rotatably fastened to end portions of opposite sides may be formed in the coupling space 210, and the magnetic module 220 may be provided in each of the moving portions 211.

The first actuator 212 for rotating the moving portion 211 provided to be rotatable may be provided, and when the first location detection sensor 150 and the second location detection sensor 230 identify that the drive module 200 and the container 100 are aligned to each other, the first actuator 212 may be operated to move the moving portion 211 to the coupling body 130 side, and the magnetic module 220 may be operated to allow the magnetic 220 to be additionally connected to the coupling body 130.

Accordingly, the coupling body 130 may be prevented from deviating to the open side of the coupling space 210.

The drive module may include a contact portion 241 coming in contact with the rotation shaft 120 and a second actuator 242 configured to move the contact portion 241 to be in contact with or separated from the rotation shaft 120.

As shown in FIG. 3 to FIG. 4, the drive module 200 may include the contact portion 241 formed to be in contact with the rotation shaft 120 and the second actuator 242 configured to move the contact portion 241 to be in contact with or release contact with the rotation shaft 120.

The coupling body 130 may be formed to surround the rotation shaft 120 at an end portion of the rotation shaft 120, and a spacing space may be provided between the coupling body 130 and the extension portion 140 so that the contact portion 241 may be moved to the spacing space by the second actuator 242 to be in contact with the rotation shaft 120.

Therefore, the contact portion 241 can come in contact with the rotation shaft 120 when the drive module 200 and the container 100 straightly drive, improving stability during straight driving and the contact portion 241 may be released from contact during turning driving to proceed with turning driving.

The container 100 may include the first connection module 160 penetrating in an upward/downward direction inside the rotation shaft 120 and formed on the internal circumferential surface thereof, and the drive module may include the second connection module 250 inserted into the first connection module 160 to connect the drive module and the container 100, and the third actuator 253 configured to move the second connection module 250 in an upward/downward direction to be coupled to or decoupled from the first connection module 160.

As shown in FIG. 5, the drive module 200 may include the first connection module 160 extending upwards from the lower portion of the coupling space 210 and the third actuator 253 connected to the second connection module 250 to move a second module in an upward/downward direction in a state in which the magnetic module 220 is connected to the coupling body 130, the rotation shaft 120 may include a perforated inside, the first connection module 160 provided inside the rotation shaft 120, and the second connection module 250 configured to be inserted into the inside of the rotation shaft 120 by the third actuator 253, to be connected to the second connection module 250.

Accordingly, that the drive module 200 and the container 100 may be fastened to each other in an upward/downward direction through the first connection module 160 and the second connection module 250 in addition to the fastening between the magnetic module 220 and the coupling portion.

The container 100 may include a battery portion 170 for storing power, and each of the first connection module 160 and the second connection module 250 may include a signal connection portion 161, 251 electrically connected to input/output a control signal therethrough, and a power connection portion 162, 252 configured to input/output power therethrough.

As shown in FIG. 5 and FIG. 6, the first connection module 160 and the second connection module 250 connected to each other in an upward/downward direction may be electrically connected to each other, and the first connection module 160 and the second connection module 250 may input/output an electrical signal and power to/from each other.

Accordingly, when the drive module 200 may be coupled to the container 100 and the first connection module 160 and the second connection module 250 are connected to each other, it is possible to receive a control signal such as a destination or driving path of the drive module 200 from the container 100 or to be charged with power by receiving power through the battery portion 170 provided in the container 100 or drive the driving device through the charged power.

As shown in FIG. 6, the connection between the first connection module 160 and the second connection module 250 may have a roller shape, but the shape is merely an exemplary embodiment of the present disclosure, and the first connection module 160 and the second connection module 250 may be electrically connected to each other in various manners.

The rotation shaft 120 and the coupling portion may be provided at the front side and the rear side of the container 100, and a plurality of drive modules 200 may be provided to be connected to the front side and the rear side of the container 100.

As shown in FIG. 1, the rotation shaft 120 and the coupling portion may be provided at the front side and the rear side of the container 100, and a plurality of drive modules 200 may be provided to be fastened to the front side and the rear side of the container 100.

Accordingly, when rotating, two drive modules 200 may respectively rotate and reduce the rotation radius of the vehicle.

An indented portion 131 may be formed on the coupling body 130 to be indented from an external circumferential surface to the center, and the magnetic module 220 may be inserted into the indented portion 131 and fastened to the coupling body 130.

As shown in FIG. 8, the coupling body 130 may be formed in a cylinder shape to surround the rotation shaft 120, and include the indented portion 131 indented from the external circumferential surface to the internal side, and when coupled to the coupling body 130, the magnetic module 220 may be inserted into the indented portion 131 to be fastened to the coupling body 130.

Accordingly, the magnetic module 220 may be prevented from moving in an upward/downward direction when fastened to the fastening portion.

The indented portion 131 may include a corrugation portion 132 protruding in a circumferential direction on an internal side surface thereof, and a surface of the magnetic module 220, which is in contact with the corrugation portion 132, may be formed to correspond to the corrugation portion 132.

As shown in FIG. 9, the indented portion 131 may include a corrugation portion 132 protruding in a circumferential direction on an internal side surface thereof, and a plurality of corrugation portions 132 may be spaced from each other in an upward/downward direction thereof.

Furthermore, a fastening region of the magnetic module 220, where the magnetic module 220 is fastened to the coupling body 130, may be formed to correspond to the corrugation portion 132, to improving fastening force when the magnetic module 220 is fastened to the coupling body 130.

FIG. 1 is a perspective view exemplarily illustrating a container swappable vehicle according to an exemplary embodiment of the present disclosure, FIG. 2 is a lateral sectional view exemplarily illustrating a container swappable vehicle according to an exemplary embodiment of the present disclosure, FIG. 3 is a sectional view of FIG. 2 taken along A-A, FIG. 4 is a sectional view of FIG. 3 taken along B-B, FIG. 5 is a sectional view of FIG. 3 taken along C-C, FIG. 6 is a view exemplarily illustrating connection of a first connection module 160 and a second connection module 250 of a container swappable vehicle according to an exemplary embodiment of the present disclosure, FIG. 7 is a planar view exemplarily illustrating a coupling space 210 and a coupling body 130 of a container swappable vehicle according to an exemplary embodiment of the present disclosure, FIG. 8 is a view exemplarily illustrating movement of a magnetic module 220 of a container swappable vehicle according to an exemplary embodiment of the present disclosure, and FIG. 9 is a view exemplarily illustrating coupling regions of a magnetic module 220 coupling body 130 of a container swappable vehicle according to an exemplary embodiment of the present disclosure.

An exemplary embodiment of the container swappable vehicle according to an exemplary embodiment of the present disclosure will be described with reference to FIG. 1 to FIG. 9.

The container swappable vehicle according to an exemplary embodiment of the present disclosure includes, specifically, a container 100 including a container body 110 configured to receive a cargo loaded therein, a rotation shaft 120 at a front end portion or a rear end portion thereof, and a coupling body 130 surrounding an external circumferential surface of the rotation shaft 120, the rotation shaft 120 and the coupling body 130 being connected to each other to be relatively rotated; and a drive module 200 including a drive device to perform driving, a coupling space 210 including an open side, and a magnetic module 220 provided in the coupling space 210 to allow the coupling body 130 of the container 100 to enter the coupling space 210 through an opening portion by driving toward the coupling body 130 of the container 100 and move the container 100 through driving by the magnetic module 220 being fastened to the coupling body 130 by magnetic force.

The container 100 may include, as described with reference to FIG. 1, the container 100 body including loading space for receiving a cargo loaded therein, and as described with reference to FIG. 2, FIG. 3 and FIG. 4, may include the rotation shaft 120 positioned at the front side or the rear side of the container body 110 and extending in an upward/downward direction, and the coupling body 130 configured to surround the rotation shaft 120.

The drive module 200 may include a drive device for driving a vehicle including a wheel, a steering system, and a power module to perform driving by itself, the coupling space 210 including an open lateral side, and may drive toward the container 100 to allow the coupling body 130 to be inserted into the open coupling space 210 so that the coupling body 130 may be inserted into an open space.

After the coupling body 130 is inserted into the open space, the magnetic module 220 provided in the open space is operated so that the coupling body 130 and the magnetic module 220 may be coupled to each other by magnetic force.

After the coupling body 130 and the magnetic module 220 are coupled to each other, the drive module is driven to move the fastened container 100 to a predetermined location. Furthermore, after the container 100 is moved to the predetermined location, the drive module and the container 100 may be released from the fastening, and the drive module may be fastened to another container 100 to move the another container 100.

The drive module may be manufactured to be configured for autonomous driving or to be directly driven by a driver boarding therein.

Furthermore, the drive module may additionally include a mount device for mounting the container 100 when the drive module and the container 100 are separated from each other.

Accordingly, the drive module 200 and the container 100 may be easily coupled to or decoupled from each other by the magnetic module 220, and thus the drive module 200 can swap and move a plurality of drive modules 200.

The container 100 may include a bearing 180 provided between the rotation shaft 120 and the coupling body 130 surrounding the rotation shaft 120 to allow the coupling body 130 to relatively rotate with the rotation shaft 120.

As shown in FIG. 3, the rotation shaft 120 may be provided on the front side or the rear side of the container 100, formed in a shape of a pillar extending in an upward/downward direction, and the coupling body 130 may be coupled to the rotation shaft 120 to surround the rotation shaft 120. The rotation shaft 120 may be formed to be fixed to the container 100 and the coupling body 130 may be coupled to the rotation shaft 120 to be rotatable by the bearing 180 with reference to the center extension line of the rotation shaft 120.

Accordingly, the drive module 200 having been coupled to the coupling body 130 by the magnetic module 220 may be reduced in rotation radius while driving by rotation of the coupling body 130.

The container 100 may include an extension portion 140 extending from an upper portion of the front side and the rear side of the container 110, the rotation shaft 120 and the coupling body 130 may extend downwardly from the lower surface of the extension portion 140, and the drive module 200 may drive toward the lower portion of the extension portion 140 to allow the coupling body 130 to be inserted into the coupling space 210.

As shown in FIG. 1 and FIG. 2, the container 100 may include the extension portion 140 extending from the upper portion of the front side and the rear side of the container (100) body in a longitudinal direction, the rotation shaft 120 may extend downwardly from the lower surface of the extension portion 140, and the coupling body 130 may be formed to surround an external circumferential surface of an end side of the extension portion 140.

For the coupling body 130 formed as described above to be inserted into the coupling space 210, the drive module 200 may drive toward the lower side of the extension portion 140 to be coupled to the container 100.

Accordingly, the rotation radius occupied by the drive module 200 during turning driving may be reduced, and the loading space may be expanded by loading a cargo up to the extension portion 140.

The container 100 may include a first location detection sensor 150 provided on the extension portion 140 or the container body 110, and the drive module 200 may include a second location detection sensor 230 provided at a location corresponding to the first location detection sensor 150 and configured to detect a relative location with the first location detection sensor 150.

As shown in FIG. 1, the first location detection sensor 150 configured for detecting a location may be provided in the container 100, and the second location detection sensor 230 may be provided in the drive module 200 at a location corresponding to the first location detection sensor 150 in a state in which the drive module is coupled to the container 100.

Accordingly, the drive module 200 and the container body 110 may accurately identify a coupling location and drive to be coupled to each other.

The first location detection sensor 150 may be provided on the lower surface of the extension portion 140 and the front surface or the rear surface of the container body 110, and a plurality of second location detection sensors 230 may be provided to correspond to the location of the first location detection sensor 150 to align locations of the container 100 and the drive module.

As shown in FIG. 2, a plurality of first location detection sensors 150 are located at positions such as the front side of the container body 110 and the lower surface of the extension portion 140, and the second location detection sensors are located on the upper side and the rear side of the drive module 200, which are locations corresponding to the first location detection sensors 150, improving accuracy of coupling of the drive module 200 and the container body 110 by aligning the drive module 200 and the container body 110 in a leftward/rightward direction and a forward/backward direction when the drive module and the container body are coupled to each other.

The first location detection sensor 150 may be provided on the lower surface of the extension portion 140 and the front surface or the rear surface of the container body 110, and a plurality of second location detection sensors 230 may be provided to correspond to the location of the first location detection sensor 150 to align locations of the container 100 and the drive module.

When the drive module 200 identifies that drive module 200 drives to the container 100 through the first location detection sensor 150 and the second location detection sensor 230, the magnetic module 220 may be fastened to the coupling body 130.

The magnetic module 220 may include a module body 221 coupled to the coupling body 130, a rotational magnetic body 222 rotatably coupled to the module body 221, a fixed magnetic body 223 fixed to the module body 221, and a coil 224 wound around and electrically connected to the module body 221, and may be coupled to or decoupled from the coupling body 130 by a magnetic circuit change through a direction of a magnetic field generated by the coil 224.

As shown in FIG. 3, the magnetic module 220 may include the module body 221, the rotational magnetic body 222 may be provided on one side of the module body 221 to be rotatably coupled to the module body 221, and the fixed magnetic body 223 is provided on the other side of the module body 221 to be fixed to the module body 221. The coil 224 may be provided between the rotational magnetic body and the fixed magnetic body 223 while being wound around and coupled to the module body 221, the coil 224 may be connected to a power source to allow a current to flow therethrough, and when a current flows through the coil 224, an electromagnet may be formed by forming a magnetic field by the wound coil 224.

A polarity of the electromagnet generated by the coil 224 may be changed through the direction of the current flowing through the coil 224, thus the rotational magnetic body 222 may rotate, the magnetic circuit formed by the rotational magnetic body 222 and the fixed magnetic body 223 may be changed, and the magnetic module 220 and the coupling body 130 may be fastened to each other by magnetic force according to the changed magnetic circuit.

The current flowing through the coil 224 may flow only at the moment at which the rotational magnetic body 222 is rotated and may be blocked after the rotational magnetic body 222 is rotated, thus achieving excellent electrical efficiency compared to an electromagnet.

As shown in FIG. 8, the change of a magnetic circuit according to the magnetic field generated by the coil 224 may be identified and the magnetic module 220 and the coupling body 130 may be coupled to each other by magnetic force according to the direction of the magnetic circuit.

When coupled to the coupling body 130, the magnetic module 220 may extend to the internal side of the coupling space 210 and fastened to the coupling body 130 by the magnetic force, and the magnetic circuit is changed through the direction of the current of the coil 224.

A plurality of magnetic modules 220 may be provided in the coupling space 210 to be fastened to the coupling body 130 in a plurality of directions.

As shown in FIG. 7, the plurality of magnetic modules 220 may be provided in the coupling space 210 to be space apart from each other and fastened to the fastening portion in various directions.

Accordingly, fastening force between the drive module 200 and the container 100 may be improved as the plurality of magnetic modules 220 are fastened to the coupling body 130 in various directions.

The drive module may include a moving portion 211 rotatably coupled to opposite end portions of an open side of the coupling space 210 and including the magnetic module 220 disposed therein, and a first actuator 212 configured to rotate the moving portion 211, and when the coupling body 130 is inserted into the coupling space 210, the moving portion 211 may be rotated to the coupling body 130 side by the first actuator 212 and the magnetic module 220 may be fastened to the coupling body 130.

As shown in FIG. 3, a pair of moving portions 211 rotatably fastened to end portions of opposite sides may be formed in the coupling space 210, and each magnetic module 220 may be provided in the moving portions 211.

The first actuator 212 for rotating the moving portion 211 provided to be rotatable may be provided, and when the first location detection sensor 150 and the second location detection sensor 230 identify that the drive module 200 and the container 100 are aligned to each other, the first actuator 212 may be operated to move the moving portion 211 to the coupling body 130 side, and the magnetic module 220 may be operated to allow the magnetic 220 to be additionally connected to the coupling body 130.

Accordingly, the coupling body 130 may be prevented from deviating to the open side of the coupling space 210.

The drive module may include a contact portion 241 coming in contact with the rotation shaft 120 and a second actuator 242 configured to move the contact portion 241 to be in contact with or separated from the rotation shaft 120.

As shown in FIG. 3 to FIG. 4, the drive module 200 may include the contact portion 241 formed to be in contact with the rotation shaft 120 and the second actuator 242 configured to move the contact portion 241 to be in contact with or release contact with the rotation shaft 120.

The coupling body 130 may be formed to surround the rotation shaft 120 at an end portion of the rotation shaft 120, and a spacing space may be provided between the coupling body 130 and the extension portion 140 so that the contact portion 241 may be moved to the spacing space by the second actuator 242 to be in contact with the rotation shaft 120.

Therefore, the contact portion 241 can come in contact with the rotation shaft 120 when the drive module 200 and the container 100 straightly drive, improving stability during straight driving and the contact portion 241 is released from contact during turning driving to proceed with turning driving.

The container 100 may include the first connection module 160 penetrating in an upward/downward direction inside the rotation shaft 120 and formed on the internal circumferential surface thereof, and the drive module may include the second connection module 250 inserted into the first connection module 160 to connect the drive module and the container 100, and the third actuator 253 configured to move the second connection module 250 in an upward/downward direction to be coupled to or decoupled from the first connection module 160.

As shown in FIG. 5, the drive module 200 may include the first connection module 160 extending upwards from the lower portion of the coupling space 210 and the third actuator 253 connected to the second connection module 250 to move a second module in an upward/downward direction in a state in which the magnetic module 220 is connected to the coupling body 130, the rotation shaft 120 may include a perforated inside, the first connection module 160 provided inside the rotation shaft 120, and the second connection module 250 configured to be inserted into the inside of the rotation shaft 120 by the third actuator 253, to be connected to the second connection module 250.

Accordingly, the drive module 200 and the container 100 may be fastened to each other in an upward/downward direction through the first connection module 160 and the second connection module 250 in addition to the fastening between the magnetic module 220 and the coupling portion.

The container 100 may include a battery portion 170 for storing power, and each of the first connection module 160 and the second connection module 250 may include a signal connection portion 161, 251 electrically connected to input/output a control signal therethrough, and a power connection portion 162, 252 configured to input/output power therethrough.

As shown in FIG. 5 and FIG. 6, the first connection module 160 and the second connection module 250 connected to each other in an upward/downward direction may be electrically connected to each other, and the first connection module 160 and the second connection module 250 may input/output an electrical signal and power to/from each other.

Accordingly, when the drive module 200 may be coupled to the container 100 and the first connection module 160 and the second connection module 250 are connected to each other, it is possible to receive a control signal such as a destination or driving path of the drive module 200 from the container 100 or to be charged with power by receiving power through the battery portion 170 provided in the container 100 or drive the driving device through the charged power.

As shown in FIG. 6, the connection between the first connection module 160 and the second connection module 250 may have a roller shape, but the shape is merely an exemplary embodiment of the present disclosure, and the first connection module 160 and the second connection module 250 may be electrically connected to each other in various manners.

The rotation shaft 120 and the coupling portion may be provided at the front side and the rear side of the container 100, and a plurality of drive modules 200 may be provided to be connected to the front side and the rear side of the container 100.

As shown in FIG. 1, the rotation shaft 120 and the coupling portion may be provided at the front side and the rear side of the container 100, and a plurality of drive modules 200 may be provided to be fastened to the front side and the rear side of the container 100.

Accordingly, when rotating, two drive modules 200 may respectively rotate and reduce the rotation radius of the vehicle.

An indented portion 131 may be formed on the coupling body 130 to be indented from an external circumferential surface to the center, and the magnetic module 220 may be inserted into the indented portion 131 and fastened to the coupling body 130.

As shown in FIG. 8, the coupling body 130 may be formed in a cylinder shape to surround the rotation shaft 120, and include the indented portion 131 indented from the external circumferential surface to the internal side, and when coupled to the coupling body 130, the magnetic module 220 may be inserted into the indented portion 131 to be fastened to the coupling body 130.

Accordingly, the magnetic module 220 may be prevented from moving in an upward/downward direction when fastened to the fastening portion.

The indented portion 131 may include a corrugation portion 132 protruding in a circumferential direction on an internal side surface thereof, and a surface of the magnetic module 220, which is in contact with the corrugation portion 132, may be formed to correspond to the corrugation portion 132.

As shown in FIG. 9, the indented portion 131 may include a corrugation portion 132 protruding in a circumferential direction on an internal side surface thereof, and a plurality of corrugation portions 132 may be formed to be spaced from each other in an upward/downward direction thereof.

Furthermore, a fastening region of the magnetic module 220, where the magnetic module 220 is fastened to the coupling body 130, may be formed to correspond to the corrugation portion 132, improving fastening force when the magnetic module 220 is fastened to the coupling body 130.

Figure 10:
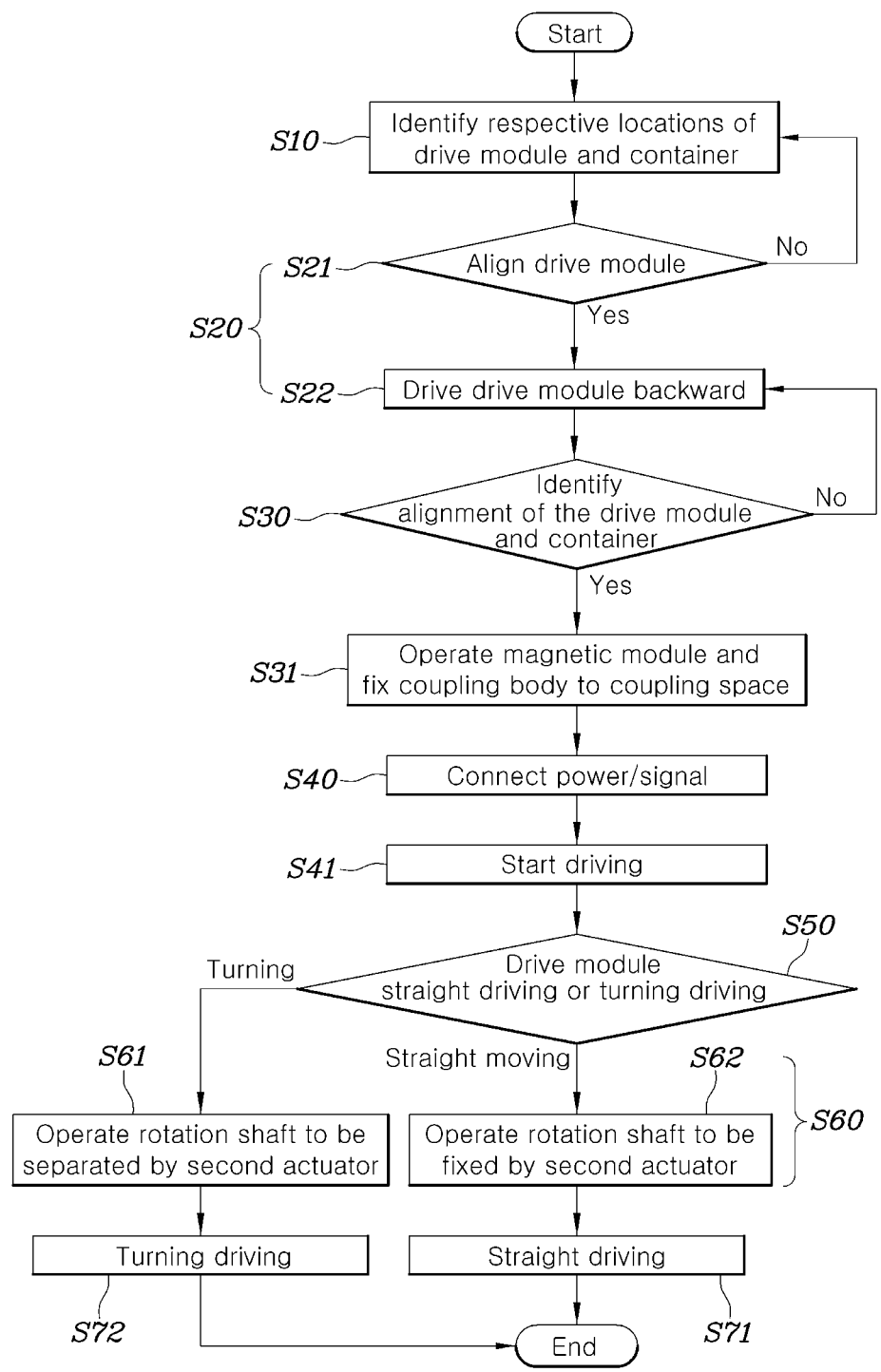
FIG. 10 is a flowchart of a method for controlling a container-swappable vehicle according to an exemplary embodiment of the present disclosure.

FIG. 10 is a flowchart of a method for controlling a container swappable vehicle according to an exemplary embodiment of the present disclosure.

An exemplary embodiment of a method of controlling a container swappable vehicle according to an exemplary embodiment of the present disclosure will be described with reference to FIG. 10.

The method of controlling a container swappable vehicle may include: an operation of identifying respective locations of a drive module 200 and a container 100 (S10); based on the locations of the drive module 200 and the container 100 identified in the operation of identifying locations (S10), an operation of moving the drive module 200 toward the container 100 so that a coupling body 130 is inserted into a coupling space 210 (S20); and an operation of coupling the drive module 200 and the container 100 by operating a magnetic module 220 (S31).

In the operation of identifying locations, the locations may be identified through a location detection sensor 150, 230 provided in the container 100 and the drive module 200, respectively, and the operation of moving and inserting the drive module 200 to the container 100 so that the coupling body 130 is inserted into the coupling space 210 (S10) may be performed.

After the operation of inserting (S10), an operation of aligning the container 100 and the drive module 200 (S30) may be performed so that the coupling body 130 is fixed by the magnetic module 220 in the coupling space 210.

The operation of inserting (S10) may include an operation of aligning the drive module 200 and the container 100 (S21) and an operation of driving the drive module 200 toward the container 100 through backward movement (S22) so that the coupling body 130 is inserted into the coupling space 210.

After the operation of coupling, an operation of connecting the drive module and the container in terms of power and a control signal (S40) may be further included.

In the operation of connecting (S40), after the operation of coupling (S31) in which the magnetic module 220 is operated to locate and fix the coupling body 130 in the coupling space 210, a second connection module 250 provided in the drive module 200 may be connected to a first connection module 160 provided in the container 100 to be electrically and signally connected so that the drive module 200 may receive power and a control signal from the container 100.

Thereafter, the drive module 200 may be driven according to a transmitted control signal (S41).

After the operation of coupling (S31), an operation of identifying a drive direction of the drive module 200 (S50) and an operation of controlling a contact portion 241 coming in contact with a rotation shaft according to straight driving or turning driving of the drive module 200 identified in the operation of identifying the drive direction, and a second actuator 242 configured to move the contact portion 241 to be in contact with or separated from the rotation shaft (S60) may be further included.

In the operation of controlling the second actuator 242 (S60), the second actuator 242 may control an operation to fix the rotation shaft (S62) when the drive module 200 straightly drives in the operation of identifying the drive direction (S50), and thereby the drive module 200 may straightly drive (S71).

Furthermore, in the operation of controlling the second actuator 242 (S60), the second actuator 242 may control an operation to allow the rotation shaft to rotate (S62) when the drive module 200 turns, and thereby the drive module 200 may turn (S72).

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A container-swappable vehicle comprising:
    a container including a container body for receiving a cargo loaded therein, and a rotation shaft at a front end portion or a rear end portion thereof and a coupling body surrounding an external circumferential surface of the rotation shaft, the rotation shaft and the coupling body being connected to each other to be relatively rotated therebetween; and
    a drive module including a drive device to perform driving, a coupling space including an open side, and a magnetic module provided in the coupling space to allow the coupling body of the container to enter the coupling space through an opening portion and move the container by the magnetic module being fastened to the coupling body by magnetic force,
    wherein the magnetic module includes a module body coupled to the coupling body, a rotational magnetic body rotatably coupled to the module body, a fixed magnetic body fixed to the module body, and a coil wound around and electrically connected to the module body, to be configured for coupling to or uncoupling from the coupling body by changing a magnetic circuit through a direction of a magnetic field formed by the coil.

2. The container-swappable vehicle of claim 1, wherein the container includes a bearing provided between the coupling body surrounding the rotation shaft and the rotation shaft so that the coupling body relatively rotates with the coupling body.

3. The container-swappable vehicle of claim 1,
    wherein the container includes an extension portion extending from an upper portion of a front side or a rear side of the container body, and the rotation shaft and the coupling body extend downwardly from a lower surface of the extension portion, and
    wherein the drive module drives toward a lower portion of the extension portion to allow the coupling body to be inserted into the coupling space.

4. The container-swappable vehicle of claim 3,
wherein the container includes a first location detection sensor provided on the extension portion or the container body, and
wherein the drive module includes a second location detection sensor provided at a location corresponding to the first location detection sensor and configured for detecting a relative location with the first location detection sensor.

5. The container-swappable vehicle of claim 4, wherein the first location detection sensor is provided on the lower surface of the extension portion and a front surface or a rear surface of the container body and a plurality of second location detection sensors are provided to correspond to the location of the first location detection sensor to align locations of the container and the drive module.

6. The container-swappable vehicle of claim 1, wherein a plurality of magnetic modules are provided in the coupling space to be coupled to the coupling body in a plurality of directions.

7. The container-swappable vehicle of claim 1,
wherein the drive module further includes a moving portion rotatably coupled to opposite end portions of the open side of the coupling space and including the magnetic module disposed therein, and an actuator configured to rotate the moving portion, and
wherein when the coupling body is inserted into the coupling space, the moving portion is rotated toward the coupling body by the actuator, and the magnetic module is fastened to the coupling body.

8. The container-swappable vehicle of claim 7,
wherein two moving portions rotatably fastened to the opposite end portions is formed in the coupling space, and three magnetic modules are provided, and
wherein two magnetic modules among the three magnetic modules are paired with the two moving portions and a remaining magnetic module is disposed between the two magnetic modules.

9. The container-swappable vehicle of claim 1, wherein the drive module includes a contact portion coming in contact with the rotation shaft and an actuator configured to move the contact portion to be in contact with or separated from the rotation shaft.

10. The container-swappable vehicle of claim 1,
wherein the container includes a first connection module penetrating through the inside of the rotation shaft in an upward and downward direction and formed on an internal circumferential surface thereof, and
wherein the drive module includes a second connection module inserted into the first connection module to connect the drive module and the container, and an actuator configured to move the second connection module in an upward and downward direction to be coupled to or decoupled from the first connection module.

11. The container-swappable vehicle of claim 10,
wherein the container includes a battery portion configured to store power, and
wherein each of the first connection module and the second connection module includes a signal connection portion electrically connected to input and output a control signal therethrough, and a power connection portion configured to input and output power therethrough.

12. The container-swappable vehicle of claim 1, wherein the rotation shaft and a fastening portion are provided on a front side and a rear side of the container, and a plurality of drive modules are provided to be connected to the front side and the rear side of the container to perform driving.

13. The container-swappable vehicle of claim 1, wherein the drive module drives toward the container so that the coupling body is inserted into the open coupling space and the magnetic module is fixed after the coupling body is inserted into the coupling space, and moves the container through driving.

14. A method of controlling the container-swappable vehicle of claim 1, comprising:
identifying respective locations of the drive module and the container;
based on locations of the drive module and the container identified in the identifying locations, moving the drive module toward the container so that the coupling body is inserted into the coupling space; and
coupling the drive module and the container by operating the magnetic module.

15. The method of controlling claim 14, further including:
connecting the drive module and the container in terms of power and a control signal after the coupling.

16. The method of controlling claim 14, further including:
identifying a drive direction of the drive module after the coupling; and
controlling a contact portion coming in contact with a rotation shaft according to straight driving or turning driving of the drive module identified in the identifying of the drive direction, and an actuator configured to move the contact portion to be in contact with or separated from the rotation shaft.

17. A container-swappable vehicle comprising:
a container including a container body for receiving a cargo loaded therein, and a rotation shaft at a front end portion or a rear end portion thereof and a coupling body surrounding an external circumferential surface of the rotation shaft, the rotation shaft and the coupling body being connected to each other to be relatively rotated therebetween; and
a drive module including a drive device to perform driving, a coupling space including an open side, and a magnetic module provided in the coupling space to allow the coupling body of the container to enter the coupling space through an opening portion and move the container by the magnetic module being fastened to the coupling body by magnetic force,
wherein an indented portion is formed on the coupling body to be indented from an external circumferential surface to the center, and
wherein the magnetic module is inserted into the indented portion and fastened to the coupling body.

18. The container-swappable vehicle of claim 17,
wherein the indented portion includes a corrugation portion protruding in a circumferential direction on an internal side surface thereof, and
wherein a surface of the magnetic module, which is in contact with the corrugation portion, is formed to correspond to the corrugation portion.

* * * * *